W. KELSEY.
DOUBLE GRIPING FLANGED DRUM, PULLEY, AND WHEEL.
No. 105,341. Patented July 12, 1870.
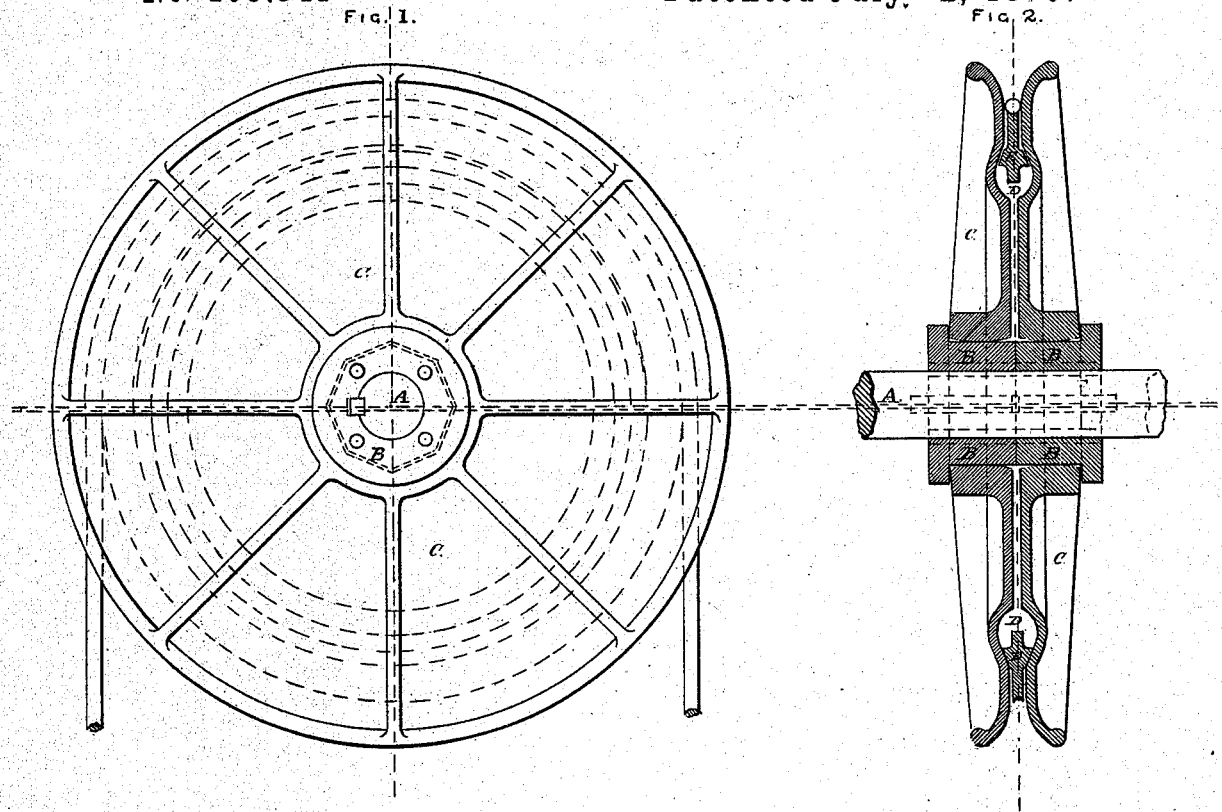

United States Patent Office.

WILLIAM KELSEY, OF LONDON, ENGLAND, ASSIGNOR FOR ONE-HALF HIS RIGHT TO HENRY AUGUSTUS CLARK, OF BOSTON, MASSACHUSETTS.

Letters Patent No. 105,341, dated July 12, 1870.

IMPROVEMENT IN DOUBLE-GRIPPING FLANGED DRUMS, PULLEYS, AND WHEELS.

The Schedule referred to in these Letters Patent and making part of the same.

Be it known that I, WILLIAM KELSEY, of 118 Cannon street, London, in the county of Middlesex, England, have invented certain Improvements in Driving-Drums, Pulleys, and Wheels; and I do hereby declare that the following is a full, clear, and exact description thereof, which will enable others skilled in mechanism to make and use the same, reference being had to the accompanying drawing forming part of this specification, in which—

Figure 1 is a side elevation, and

Figure 2, a vertical section of the driving-drum or pulley, having two loose flanges or disks, with wedge-shaped ring between them.

Figure 3 is a section of a driving-drum or pulley having only one loose flange or disk.

Figure 4 is a section of a driving-drum, pulley, or wheel, showing the ring or wheel keyed to the shaft or axle, and having loose flanges or disks mounted upon the boss.

Figure 5 is a section of a driving-drum, pulley, or wheel, having an internal wedge-shaped ring cast upon one of the flanges, the other flange being securely keyed to the shaft.

Figure 6 shows application of drum, pulley, or wheel, as friction-gearing.

The invention consists of constructing driving-drums, pulleys, or wheels, in such a manner or form that the pull upon the rope or band, or pressure of an external pulley or wheel, or the weight of a bar, rod, rail, engine, or car, shall cause the rope or band, external pulley or wheel, or bar, rod, or rail, to be gripped by the flanges or disks of the said drum, pulley, or wheel.

In the accompanying drawing—

A represents a driving-shaft or axle,

B, a driving boss, which may be made of an octagonal shape, as shown, or of any other form, so long as the object of driving round the two flanges or disks of the drum, pulley, or wheel, is obtained.

C C are two flanges or disks mounted upon the driving boss B, and are kept in position by means of two hoops cast upon the ends of the said boss.

These flanges or disks have a recess, D D, formed on the inner face of each, which recess, when the two faces of the said flanges or disks are brought together, forms an angular space, as shown in fig. 2.

In the recess or angular space I insert a wedge-ring, E E. This ring, however, may be made with curved contact-points, instead of flat ones, as shown in fig. 2.

The gripping-surfaces of the flanges or disks may also be made plain, corrugated, or of any other form to suit the special section of rope, band, rod, bar, or rail, employed. In some cases these drums, pulleys, or wheels, may be so constructed as to dispense with the driving-boss B, in place of which one or more keys may be used, such keys being firmly bedded into and secured to the driving-shaft. The top face of the keys would be flat, but each side would be curved, to allow of the inclination of the flanges or disks, as hereinafter described. The flanges or disks would be mounted directly upon the driving-shaft, the center holes being bored out to fit the shaft, but of the same form, as shown in fig. 2. Two hoops would be secured to the driving-shaft outside the flanges or disk, so as to retain them in their proper position.

Although I prefer to construct my drums, pulleys, or wheels, in the form above described, and illustrated in figs. 1 and 2, yet there are other modifications which would not depart from the spirit of my invention; as, for instance, I may make the drum, pulley, or wheel, with one loose flange or disk only, as shown in fig. 3, the other flange or disk being firmly keyed to the driving-shaft A. In all other details the drum, pulley, or wheel, would be similar to that shown in figs. 1 and 2; or, Secondly, I may make the drum, pulley, or wheel, as shown in fig. 4. This modification is specially applicable to the driving-wheels of locomotive steam-engines, for ascending steep inclines, and where a side grip on the rail, in addition to the usual adhesion, would be an advantage. For this purpose I form the wedge-shaped ring E E into the body of the wheel, and secure it firmly to the shaft or axle A. On the boss B of this ring or wheel I mount the two loose flanges or disks C C, the center holes in which are bored somewhat larger in diameter, to allow for the descent of the flanges or disks upon the body of the wheel. The cone or wedge-shape of the ring or wheel is reversed in this case. I also form or secure upon the periphery of the loose flanges or disks tires, of the usual shape, but placed in a reverse position to each other, so that the flanges of the tires may grip the rail G between them. The two flanges or disks are kept in position by means of hoops shrunk upon each end of the boss of the ring or wheel; or, Thirdly, I may make the drum, pulley, or wheel, as shown in fig. 5, one of the flanges or disks C C having the wedge-shaped ring E E firmly attached thereto, or cast thereon, thus together forming the body of the drum, pulley, or wheel, the other flange or disk C C being loose upon the boss, and having the same action as shown in fig. 3; or, Fourthly, I may make the drum, pulley, or wheel, as shown in fig. 6, where it is made available as a friction-gearing. The drum or pulley is constructed as shown, also, in figs. 1 and 2, but in place of a rope I insert the wedge-formed tire of the wheel F, allowing the said point to press up the wedge-ring E E or flanges of the pulley. The rim of the wheel F would be preferably made of an angular form, as shown, so that the point of the wheel F might press fairly upon the internal wedge-ring or flange of the pulley, and also that the contact-surfaces of the flanges C C and the wheel F may readily separate.

In cases in which the drum, pulley, or wheel, is of large diameter, and used in a vertical position, or when it is essential to convey excessive power, it may be found beneficial to support the conical ring E E upon a spring or springs of steel or India rubber. In such cases the said spring or springs may be introduced between the under side of the ring E E and the shoulders of the flanges or disks C C, immediately beneath the ring, the said shoulders being made of a proper form to receive the spring or springs, or a circular ring of India rubber may be employed in place of steel. The object in using such springs would be to facilitate the gravitation of the conical ring E E, and relieve the flanges of the disks C C from the weight of the said ring, which would have a tendency to rest heavily upon the lower part of the said flanges when the drum, pulley, or wheel, is used in a vertical position, and when the rope leads off at any angle except that of ninety degrees.

The action of a drum, pulley, or wheel, constructed as shown in figs. 1, 2, 3, 5, and 6, is caused by the strain of the rope or band, pressure of an external pulley or wheel, or the weight of a bar, rod, or rail, being thrown upon the internal wedge-ring in the recess, and the said ring is then forced against the face or faces of the recess on the opposite side of the drum, pulley, or wheel, thereby forcing apart the two flanges or disks on that side, and bringing them together on the side next the rope, band, external pulley, or wheel, bar, rod, or rail, as the case may be, which is thereby compressed and held firmly by the two flanges or disks, and released as the drum, pulley, or wheel, revolves.

The action of a railroad-wheel constructed as shown in fig. 4 is caused by the weight of the engine or car being thrown on the flanges or disks, so as to force them apart upon the upper or top side of the wheel, and toward each other on the side next the rail, which is thereby firmly gripped by the tires of the flanges or disks.

I am aware that pulleys have been invented, and are already in use, for preventing the slipping of wire ropes, when used for driving purposes, but such pulleys are made by forming several separate nipping-parts, and attaching them, by means of short hinges, to and around one or both sides of the periphery of the said pulleys. My mechanism is, however, less costly, more effective, less liable to get out of repair, and produces less wear and tear upon the rope, and is, moreover, applicable to a greater number of uses than the pulleys just before alluded to.

Having thus described the nature of my invention, What I do claim as new, and desire to secure by Letters Patent, is—

1. Drums, pulleys, or wheels, having a loose internal wedge-shaped ring inserted between two loose flanges or disks, in the manner and for the purposes hereinbefore described.

2. Drums, pulleys, or wheels, having a loose internal wedge-shaped ring inserted between two flanges or disks, one of which is loose, and the other keyed or securely fastened to the shaft, in the manner and for the purposes hereinbefore described.

3. Drums, pulleys, or wheels, having an internal wedge-shaped ring keyed to the shaft between two loose flanges or disks, in the manner and for the purposes hereinbefore described.

4. Drums, pulleys, or wheels, having an internal wedge-shaped ring securely fastened to or cast upon one of the flanges or disks, either this flange or disk to which the wedge-ring is attached, or the other one to which it is not attached, being securely keyed to the shaft, in the manner and for the purposes hereinbefore described.

5. Drums, pulleys, or wheels, constructed as hereinbefore described, to be used in connection with wire or other ropes, bands, chains, bars, rods, or rails, for the purpose of transmitting power, as set forth.

6. The combination of a clip-pulley, constructed as hereinbefore described, with one or more wheels, having one or more properly formed flanges, the whole constituting an improved system of frictional gearing.

7. The above-described mechanism, arranged so as to be applicable to railroad-engine or car-wheels, in the manner and for the purposes set forth.

London, May 19, 1870.

WM. KELSEY.

Witnesses:
   H. J. GRISWOLD,
      8 Southampton Buildings.
   M. WYNN,
      24 Royal Exchange, London.